United States Patent
Hashimoto et al.

(10) Patent No.: US 6,848,217 B2
(45) Date of Patent: Feb. 1, 2005

(54) VEHICLE WEATHER STRIP FOR SEALING BETWEEN A PASSENGER COMPARTMENT AND A CARGO COMPARTMENT

(75) Inventors: Takashi Hashimoto, Tokyo (JP); Sugami Mitate, Hiroshima (JP); Akira Tamagawa, Hiroshima (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/321,618

(22) Filed: Dec. 18, 2002

(65) Prior Publication Data

US 2003/0121211 A1 Jul. 3, 2003

(30) Foreign Application Priority Data

Dec. 27, 2001 (JP) .......................... 2001-396092

(51) Int. Cl.[7] .................................. E06B 7/16
(52) U.S. Cl. .................. 49/490.1; 49/495.1; 49/498.1
(58) Field of Search ......................... 49/490.1, 495.1, 49/498.1

(56) References Cited

U.S. PATENT DOCUMENTS

| | | | | |
|---|---|---|---|---|
| 3,411,244 A | * | 11/1968 | Horner ...................... 49/490.1 |
| 4,143,497 A | * | 3/1979 | Offenbacher ........... 52/204.597 |
| 4,324,826 A | * | 4/1982 | Ginster ........................ 428/122 |
| 4,447,065 A | * | 5/1984 | Dupuy et al. ................ 277/642 |
| 4,617,220 A | * | 10/1986 | Ginster ........................ 428/122 |
| 4,749,203 A | * | 6/1988 | Bright .......................... 277/642 |
| 5,069,497 A | * | 12/1991 | Clelland ...................... 296/155 |
| 5,622,008 A | * | 4/1997 | King .......................... 49/498.1 |
| 5,626,383 A | * | 5/1997 | Lee et al. ................. 296/146.9 |
| 5,840,401 A | * | 11/1998 | Baesecke ..................... 428/122 |
| 6,447,039 B1 | | 9/2002 | Song |
| 6,481,772 B1 | * | 11/2002 | Tenn ........................ 296/26.11 |
| 6,513,863 B1 | * | 2/2003 | Renke et al. .......... 296/190.11 |
| 6,547,298 B2 | * | 4/2003 | Sotiroff et al. ........... 296/24.43 |
| 6,550,849 B1 | * | 4/2003 | Dosdall .................... 296/183.1 |

* cited by examiner

Primary Examiner—Gregory J. Strimbu
(74) Attorney, Agent, or Firm—Smith, Gambrell & Russell

(57) ABSTRACT

A weather strip for sealing a gap between an opening and a partition panel in a vehicle, including a grip part attached on the vehicle body, a lip part that contacts the partition panel, and a connection part connecting the grip part with the lip part. The grip part, the lip part, and the connection part being integral with each other, and upper surfaces of the grip part and the lip part are formed approximately as a flat plane so as to improve a waterproof property of the weather strip.

4 Claims, 4 Drawing Sheets

VEHICLE WEATHER STRIP FOR SEALING BETWEEN A PASSENGER COMPARTMENT AND A CARGO COMPARTMENT

BACKGROUND OF THE INVENTION

1. Field of the Invention

The present invention relates to a weather strip for a vehicle, more specifically to a weather strip for a partition panel for opening and closing a passenger compartment and a cargo compartment of a vehicle.

2. Discussion of the Related Art

FIG. 3 is a schematic diagram for showing a so-called pick-up type vehicle 51. An opening is formed between a cargo compartment 52 and a passenger compartment 53 at a rear part of the vehicle 51. A partition panel 54 is provided for covering the opening. When the panel 54 is moved down to a bottom of the passenger compartment 53, the opening is accessible, while when the panel 54 is raised up, the opening is closed.

The partition panel 54 is installed in a vehicle body, for example, on a floor so as to freely swing via a hinge 56 provided at a bottom edge of the partition panel 54. When the panel 54 is moved down to the bottom of the passenger compartment 53, the cargo compartment 52 is open to the passenger compartment 53. In this condition, it is possible to carry such a longer cargo as a surfboard by inserting the cargo into the passenger compartment 53.

A weather strip is provided around the opening of such vehicle 51 at the side of the cargo compartment 52. The weather strip contacts the partition panel 54 when the partition panel 54 is closed, and prevents water from penetrating into the passenger compartment 53 when it rains or the vehicle 51 is washed with high pressure water spray.

FIG. 4 is a cross section for showing a known weather strip 61 for the partition panel 54. The weather strip 61 is attached to a bottom part of the opening at the side of the cargo compartment 52. The weather strip 61 comprises a grip part 62, a lip part 63, and a connection part 64 for connecting the grip part 62 with the lip part 63. The grip part 62 has a U-shaped cross section, and a plurality of fins 65 are provided as protrusions at an inner periphery of the grip part 62. Namely, the grip part 62 is configured so as to fit with a flange 66 provided at the side of the cargo compartment 62. The lip part 63 is formed to be hollow as shown in the cross section. A pointed end 63a of the lip part 63 faces the partition panel 54 and contacts the partition panel 54 when the panel 54 is closed. Furthermore, a tray 68 is provided on the cargo compartment 52 and covers the flange 66 and the grip part 62.

In the weather strip 61, however, the connection part 64 has a recessed upper surface. In other words, the connection part 64 is so constructed that the upper surface thereof is lower than the upper surface of the grip part 62. Therefore, the weather strip 61 is not strong enough for sufficiently enduring an applied pressure.

When the partition panel 54 is closed, the connection part 64 easily deforms or buckles down. Then, the pointed end 63a of the lip part 63 cannot be properly pressed against the partition panel 54. Hence, a satisfactory watertight property cannot be maintained. In particular, there is a possibility that water will leak into the passenger compartment 53 during heavy rains or when in a high-pressure car wash.

The partition panel 54 comes into contact with the pointed end 63a of the lip part 63 when the panel 54 is swung up and closed. In accordance with the pivotal movement of the partition panel 54, there is a possibility that the lip part 63 is pushed down and downwardly bent. When this occurs, the watertight property is decreased by the movement of the lip part 63 in an undesired direction, whereby water easily comes into the passenger compartment 53 when it rains or when the vehicle is washed.

As mentioned above, the upper surface of the connection part 64 has a depressed portion. Water or dirt can collect in the depressed portion when it rains or when the car is washed and may affect the appearance of the vehicle, for example by staining the depressed portion.

OBJECT AND SUMMARY OF THE INVENTION

It is therefore an object of the present invention to provide a weather strip for a partition panel of a vehicle wherein a connection part in the weather strip is prevented from deformation, watertight property is improved when a partition panel of the vehicle is closed, a lip part of the weather strip is prevented from being moved in an undesired direction and water or dirt will not be gathered on the connection part of the weather strip.

The above-mentioned object is achieved by a weather strip for a vehicle body having an opening provided between a passenger compartment and a cargo compartment, and a partition panel for opening and closing the opening, the weather strip being in contact with the partition panel when the partition panel is closed, comprising a grip part attached to the vehicle body at a peripheral part of the opening, a lip part configured to contact the partition panel, and a connection part connecting the grip part with the lip part, the grip part, the lip part, and the connection part being integral with each other, the connection part and the grip part having upper surfaces which face in an upward direction with respect to the vehicle body, and the upper surfaces formed approximately as a flat plane.

The above object is also achieved by a weather strip for a vehicle body having an opening provided between a passenger compartment and a cargo compartment, and a partition panel for opening and closing the opening, the partition panel being pivotable via a hinge positioned at a bottom portion of the partition panel, the partition panel being opened by a pivotal movement toward the passenger compartment and being closed by a pivotal movement toward the cargo compartment, the weather strip being in contact with the partition panel when the opening is closed, comprising a grip part attached on the opening at one peripheral part of the opening, a lip part configured to contact the partition panel; and a connection part connecting the grip part with the lip part, the grip part, the lip part, and the connection part being integral with each other, the connection part and the grip part having upper surfaces which faces in an upward direction with respect to the vehicle body, and the upper surfaces being formed approximately as a flat plane.

Another object of the present invention is to provide a weather strip for a partition panel of a vehicle wherein the lip part is certainly moved in an upward direction without being bent into an undesired direction, and watertight property is further improved, wherein the lip part comprises a pointed end arranged at a position higher than an upper surface of the grip part, the pointed end provided as a first sealing part for sealing the partition panel as a first sealing part when the partition panel is closed.

A further object of the present invention is to provide a weather strip for a partition panel of a vehicle wherein water accidentally gathered between the tray and the grip part will never pass through the first sealing part wherein the first sealing part is arranged at a location higher than an upper surface of a tray provided on the cargo compartment, and the tray being provided over the grip part for covering the grip part when the partition panel is closed.

A still further object of the present invention is to provide a weather strip for a partition panel of a vehicle which has a further improved waterproof property and an increased surface pressure at the lip part, wherein the lip part further comprises a second sealing part which is formed below the first sealing part, the second sealing part being formed at a height of the grip part, and the second sealing part contacting the partition panel prior to the first sealing part when the partition panel is being closed.

BRIEF DESCRIPTION OF THE DRAWINGS

A more complete appreciation of the present invention and many of attendant advantages thereof will be readily perceived as the same becomes better understood by reference to the following detailed description when considered in connection with the accompanying drawings, wherein.

DETAILED DESCRIPTION OF THE INVENTION

Other feature of the present invention will become understood in the course of the following description of exemplary embodiments, which are given for illustration of the present invention and are not intended to be limiting thereof.

Figure 1:
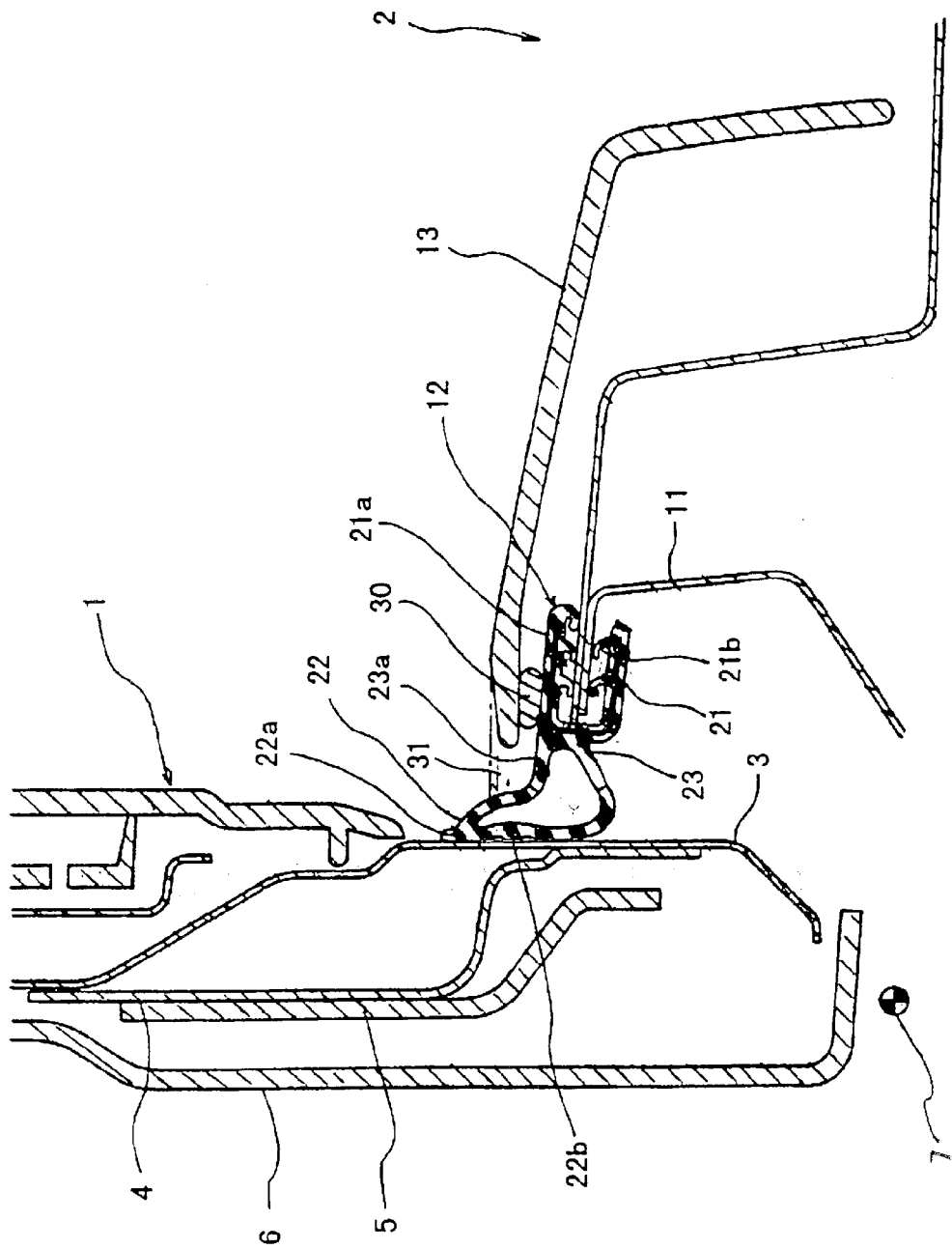
FIG. 1 is a cross section for showing a bottom part of a partition panel which is in contact with a weather strip as an embodiment of the present invention.

FIG. 1 shows a partition panel 1 provided in a pick-up type vehicle. The partition panel 1 is formed mainly by an outer panel 3, an inner panel 4, a reinforcing member 5, and a trim board 6. The outer panel 3 is provided at an end of a cargo compartment 2 of the vehicle when the partition panel 1 is closed. The trim board 6 is provided to face toward a passenger compartment side of the vehicle (not shown). The inner panel 4 is attached to the outer panel 3, and then the reinforcing member 5 is attached to the inner panel 4. The partition panel 1 having such structure is installed on a vehicle body, for example, on a floor or the like via a hinge 7 provided on a lower end of the panel 1. The partition panel pivots on the hinge 7.

The partition panel 1 is provided at an opening (not shown) formed at the rear side of the passenger compartment. The weather strip 12 is attached to a flange 11 provided on a floor or a bed of the cargo compartment. In this embodiment, the partition panel 1 is opened when swung toward the passenger compartment, and closed when swung or pivoted toward the cargo compartment 2. A tray 13 is provided in the cargo compartment and covers the flange 11 and a grip part 21 of the weather strip 12.

The weather strip 12 is provided at a bottom of the opening near the hinge 7, and is composed of a grip part 21 attached to the flange 11, a lip part 22 contacted with the partition panel 1, and a connection part 23 provided between the grip part 11 and the lip part 22. The upper surface of the connection part 23 is not recessed and is formed as a flat surface 23a extending from an upper surface 21a of the lip part 21 without a gap/concave section between the connection part 23 and the lip part 21.

The lip part 22 has a hollow cross section as shown in FIG. 1. A pointed end of the lip part 22 is positioned at a location higher than the upper surface 21a of the grip part 21 when the partition panel 1 is open without the lip part 22 contacting the partition panel 1. The pointed end is located higher than the upper surface of the tray 13 when the partition panel 1 is closed as shown in FIG. 1. In the figure, the pointed end is formed as a first sealing part 22a which contacts the partition panel 1. The lip part 22 also has a second sealing part 22b in the shape of a protrusion.

Figure 2:
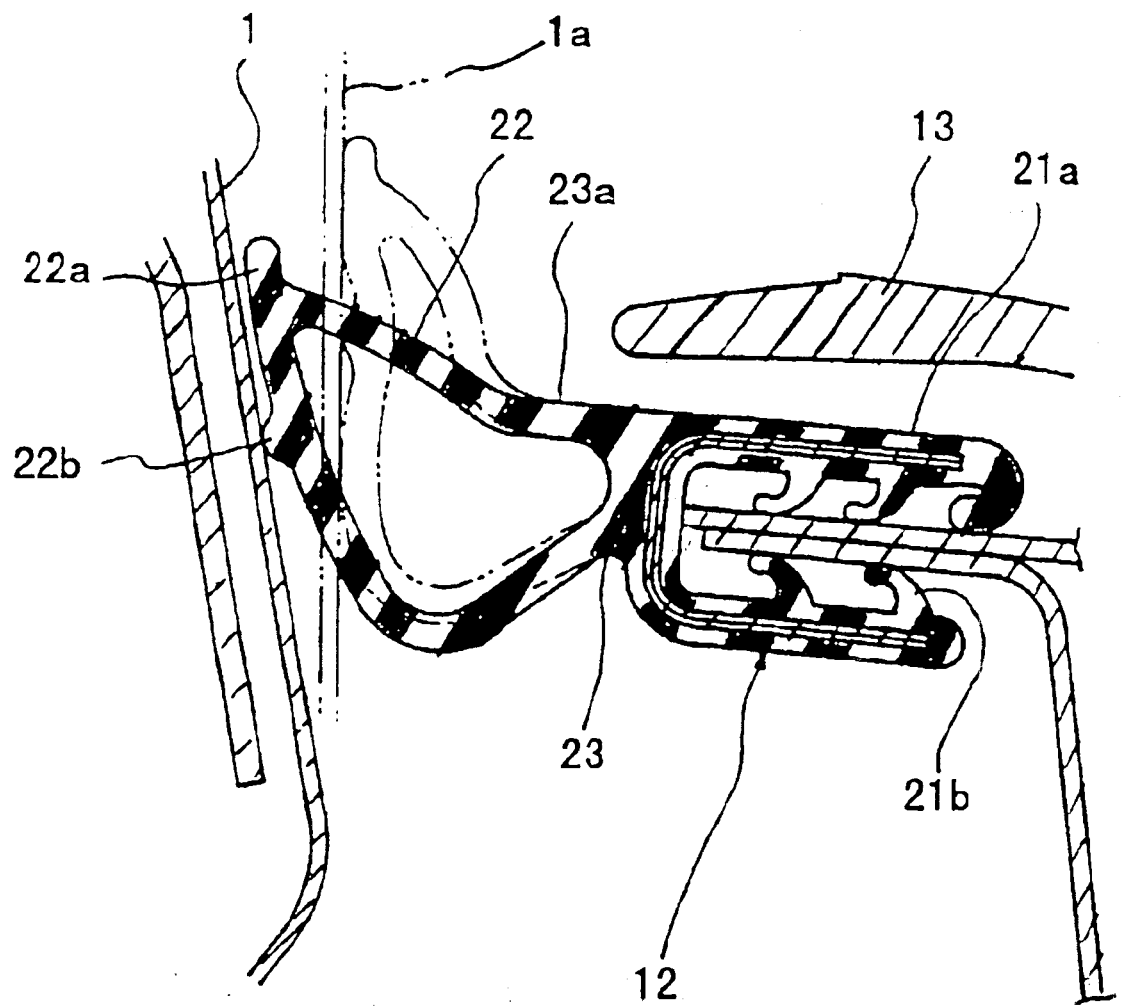
FIG. 2 is an expanded cross section for explaining the weather strip shown in FIG. 1.
Figure 3:
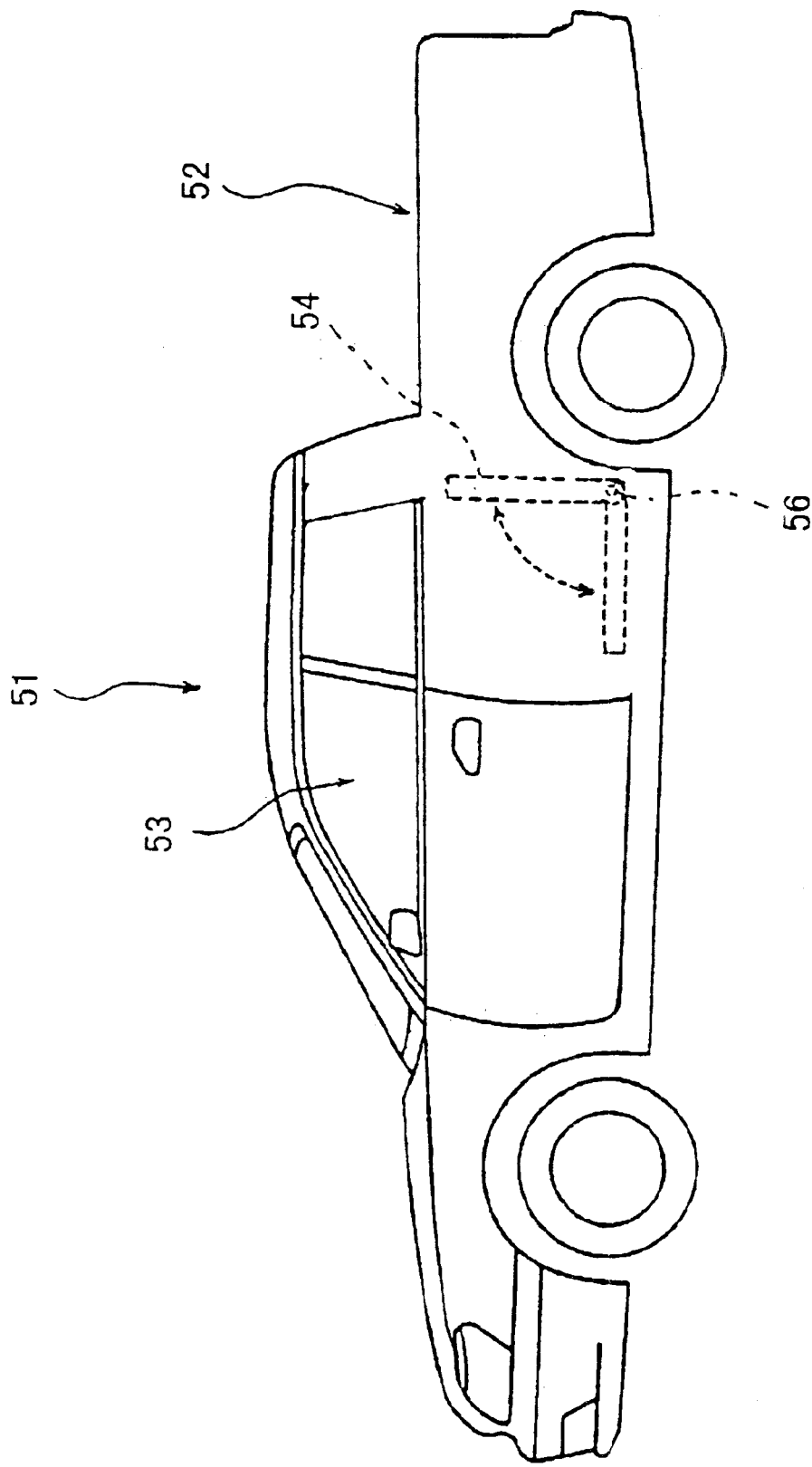
FIG. 3 is a diagram for showing a vehicle to which a weather strip of the present invention can be attached.
Figure 4:
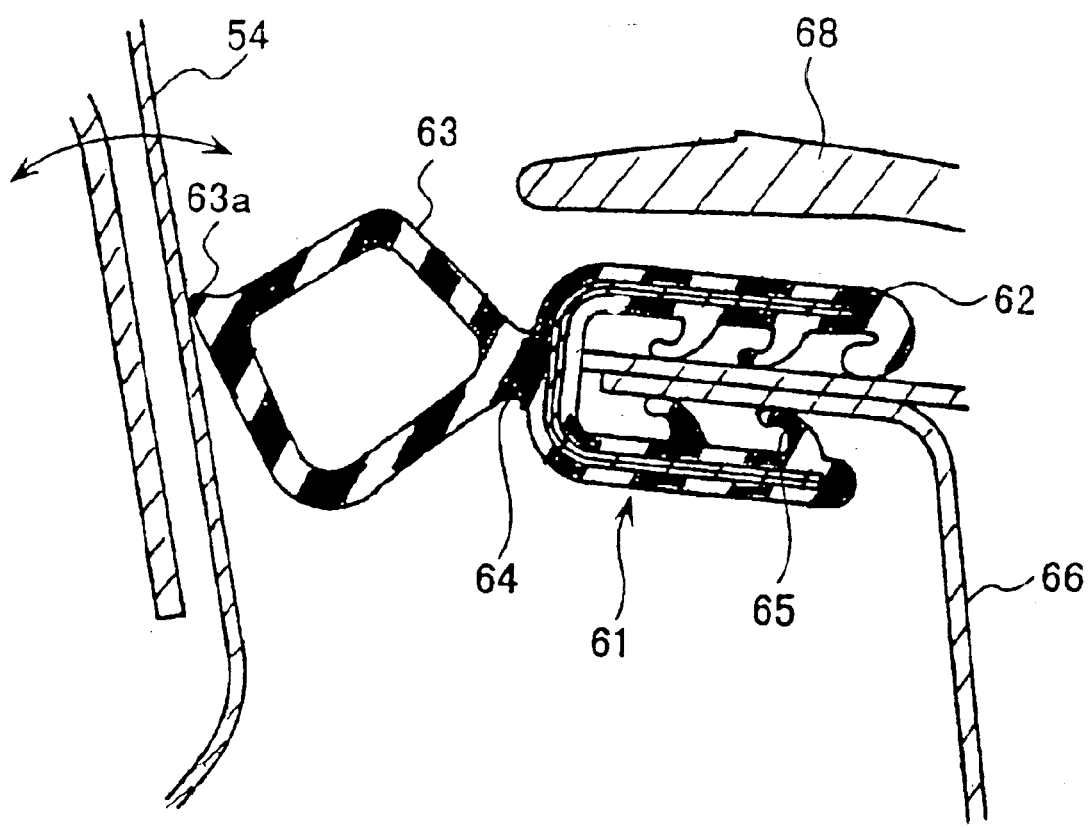
FIG. 4 is a cross section for explaining a conventional weather strip.

FIG. 2 is an enlarged cross section of a part of FIG. 1. The members which are the same as those in FIG. 1 are indicated by the same reference numeral employed therefor. When the partition panel 1 is closed by a pivotal movement on the hinge 7, the second sealing part 22b first comes into contact with the panel 1 as shown in a partial view shown by a solid line in FIG. 2, and then the first sealing part 22a contacts the panel 1 as shown by an imaginary line 1a in FIG. 2.

The grip part 21 has a cross section approximately in a U shape, having a plurality of fins 21b at an inner periphery of the grip part 21 for engaging with the flange.

As mentioned above, the weather strip 12 is prepared to have an upper surface (when installed into the vehicle body) of the connection part 23 as a flat surface 23a. The upper flat surface 23a is extended from the upper surface 21a of the grip part 21 without having a gap therebetween. Therefore, the connection part 23 has a thickness for maintaining a satisfactory strength of the weather strip 12. The connection part 23 is protected from press deformation or buckling deformation when the partition panel 1 is closed. Furthermore, water or dirt will not be collected on the connection part 23, so that a neat appearance of the vehicle is maintained.

The lip part 22 has the first sealing part 22a which is protruded beyond the upper surface 21a of the grip part 21. The first sealing part 22a contacts the partition panel 1. On the lip part 22, the second sealing part 22b is formed approximately on an extension line drawn from an upper longitudinal portion of the grip part 21. The second sealing part 22b comes into contact with the partition panel 1 earlier than with the first sealing part 22a when the panel 1 is closed. Since the connection part 23 is strong, the second sealing part 22 comes into pressure contact with the panel 1 with an appropriate surface pressure to provide a sealing effect.

Accordingly, the weather strip 12 of the present invention secures a watertight property of the vehicle when the partition panel 1 is closed, so that water will never penetrate the passenger compartment.

Moreover, the weather strip 12 of the present invention has a hollow cross section. When the vehicle is washed by the application of a high pressure water spray, water pressure applied to the lip part 22 increases the surface pressures at the first and second sealing parts 22a and 22b. Therefore, the watertight property of the vehicle is further increased when washed by the high pressure car water spray. Even if water penetrates through the first sealing part 22a, the second sealing part 22b prevents water from further penetration. Thus, it is possible to positively prevent water from penetrating into the passenger compartment by the weather strip according to the present invention.

As previously described, the first sealing part 22a is upwardly protruded beyond the upper surface 21a of the grip part 21 when the partition panel 1 is opened. When the partition panel 1 is closed by the pivotal movement of the panel 1 in the direction of the cargo compartment, the first sealing part 22a slides up on the surface of the partition panel 1. Therefore, the first sealing part 22a will never be downwardly bent.

The lip part 22 is designed to have the first sealing part 22a at a location higher than the surface of the tray 13 when the partition panel 1 is closed. When trash 30 or the like is caught between the tray 13 and the grip part 21 as shown in FIG. 1 by hatching, water 31 may collect between the weather strip 12 and the tray 13. Even in such case, the surface level of water 31 will be still lower than the first sealing part 22a. Therefore, water 31 will never pass through the first sealing part 22a.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

Other structures and functions that may be disclosed in Japanese Patent Application 2001-396092, filed on Dec. 27, 2001 are hereby incorporated by reference into this application.

What is claimed is:

1. A vehicle having an opening provided between a passenger compartment and a cargo compartment, a partition panel being provided to open and close the opening, and a weather strip, the partition panel being pivotable via a hinge positioned at a bottom portion of the partition panel, the partition panel being opened by a pivotal movement toward the passenger compartment and being closed by a pivotal movement toward the cargo compartment, said weather strip provided to contact the partition panel when the partition panel closes the opening, the weather strip comprising:

a grip part attached to a peripheral part of the opening, said grip part having a first upper surface facing an upward direction;

a lip part contacting the partition panel when said partition panel closes the opening; and a connection part connecting said grip part with said lip part, said connection part having a second upper surface the upward direction, said grip part, said lip part, and said connection part being integral with each other, said first upper surface and said second upper surface being approximately in one plane, wherein said lip part comprises a pointed end arranged at a position higher than the first upper surface of said grip part, said pointed end is provided as a first sealing part for sealing the partition panel when said partition panel is closed, and wherein said lip part further comprises a second sealing part provided at a position below said first sealing part, said second sealing part being formed approximately at a same height of said grip part, and said second sealing part contacting the partition panel before said first sealing part as the partition panel is moved toward closing the opening.

2. The vehicle as claimed in claim 1, wherein:

when the partition panel is closed, said first sealing part is arranged at a location higher than an upper surface of a tray provided in the cargo compartment.

3. The vehicle as claimed in claim 1, wherein said lip part has a hollow cross-section.

4. The vehicle as claimed in claim 1, wherein said lip part includes a partition panel contact section extending from said pointed end, and said partition panel contact section having a protrusion which defines said second sealing part positioned below the first sealing part.

* * * * *

UNITED STATES PATENT AND TRADEMARK OFFICE
CERTIFICATE OF CORRECTION

PATENT NO. : 6,848,217 B2
DATED : February 1, 2005
INVENTOR(S) : Takashi Hashimoto et al.

It is certified that error appears in the above-identified patent and that said Letters Patent is hereby corrected as shown below:

<u>Title page,</u>
Item [73], Assignee, please insert the following co-Assignee: -- Nishikawa Rubber Co., Ltd., Hiroshima (JP) --

Signed and Sealed this

Seventh Day of June, 2005

JON W. DUDAS
*Director of the United States Patent and Trademark Office*